United States Patent
Sobota Rodriguez et al.

(10) Patent No.: US 11,186,187 B1
(45) Date of Patent: Nov. 30, 2021

(54) OPTO-INDUCTIVE COUPLING SYSTEM AND METHOD FOR WIRELESS CHARGING AND DATA COMMUNICATIONS

(71) Applicant: Stephen Melvin, Bellingham, WA (US)

(72) Inventors: Cristian A. Sobota Rodriguez, Las Palmas de Gran Canaria (ES); Adolfo Nemirovsky, San Jose, CA (US)

(73) Assignee: Stephen Melvin, Vancouver (CA)

( * ) Notice: Subject to any disclaimer, the term of this patent is extended or adjusted under 35 U.S.C. 154(b) by 165 days.

(21) Appl. No.: 16/812,335

(22) Filed: Mar. 8, 2020

Related U.S. Application Data

(63) Continuation of application No. PCT/US2018/049912, filed on Sep. 7, 2018.
(Continued)

(51) Int. Cl.
*B60L 53/12* (2019.01)
*H02J 50/40* (2016.01)
(Continued)

(52) U.S. Cl.
CPC .............. *B60L 53/12* (2019.02); *B60L 53/305* (2019.02); *B60L 53/62* (2019.02); *B60L 53/665* (2019.02);
(Continued)

(58) Field of Classification Search
CPC ........ B60L 53/12; B60L 53/305; B60L 53/62; B60L 53/665; H02J 7/14; H02J 50/402;
(Continued)

(56) References Cited

U.S. PATENT DOCUMENTS

| 5,311,973 | A | 5/1994 | Tseng |
| 5,630,216 | A | 5/1997 | McEwan |

(Continued)

FOREIGN PATENT DOCUMENTS

WO 2010/129369 A2 11/2010

OTHER PUBLICATIONS

International Search Report, PCT Application No. PCT/US18/049912.
(Continued)

*Primary Examiner* — Paul Dinh
(74) *Attorney, Agent, or Firm* — Stephen W. Melvin

(57) ABSTRACT

A wireless recharging system and method in which, by means of direct optical coupling, a matrix of coils and their respective LED lights or lasers interact transmitting and receiving light pulses and wireless power bursts in a fast control loop scheme, allowing precise current control and efficient energy transmission rates with integrated optical data communications in the same interface. An alignment mechanism in which in the matrix of coil transmitters only those receiving direct pulsed light are activated, keeping other coils off, extending the active charging surfaces and improving the overall efficiency, avoiding the requirement of precisely positioning wireless power receptors. A range of power transmission rates and the possibility of recharging different devices with different power requirements simultaneously while laying on top of the charging surface, acting also as an optical communication hub. Charging of vehicles while in motion due to the fast responsiveness of the optical communication.

30 Claims, 16 Drawing Sheets

Related U.S. Application Data

(60) Provisional application No. 62/556,332, filed on Sep. 8, 2017.

(51) Int. Cl.
  *H02J 50/80* (2016.01)
  *H02J 50/30* (2016.01)
  *H02J 7/14* (2006.01)
  *B60L 53/62* (2019.01)
  *H02J 50/90* (2016.01)
  *H02J 50/10* (2016.01)
  *B60L 53/66* (2019.01)
  *B60L 53/30* (2019.01)
  *H02J 7/00* (2006.01)

(52) U.S. Cl.
  CPC ............ *H02J 7/00034* (2020.01); *H02J 7/14* (2013.01); *H02J 50/10* (2016.02); *H02J 50/30* (2016.02); *H02J 50/402* (2020.01); *H02J 50/80* (2016.02); *H02J 50/90* (2016.02)

(58) Field of Classification Search
  CPC ......... H02J 7/00034; H02J 50/30; H02J 50/80; H02J 50/90; H02J 50/10
  USPC ......................................................... 320/108
  See application file for complete search history.

(56) References Cited

U.S. PATENT DOCUMENTS

| | | | | |
|---|---|---|---|---|
| 8,965,720 | B2* | 2/2015 | Azancot | H02J 50/90 |
| | | | | 320/108 |
| 10,020,680 | B2* | 7/2018 | Raveh | H02J 50/10 |
| 10,523,054 | B2* | 12/2019 | Ben-Shalom | H02J 50/80 |
| 2010/0044123 | A1 | 2/2010 | Perlman | |
| 2010/0219698 | A1 | 9/2010 | Azancot | |
| 2010/0289448 | A1* | 11/2010 | Jung | H02J 50/10 |
| | | | | 320/108 |
| 2012/0175969 | A1 | 7/2012 | Maughan | |
| 2013/0119929 | A1 | 5/2013 | Partovi | |
| 2013/0193276 | A1 | 8/2013 | Hunter | |
| 2014/0132210 | A1 | 5/2014 | Partovi | |
| 2014/0354074 | A1 | 12/2014 | Sadakata | |
| 2016/0311329 | A1 | 10/2016 | Rodriguez | |
| 2017/0090134 | A1 | 3/2017 | Williams | |
| 2017/0141612 | A1 | 5/2017 | Xu | |

OTHER PUBLICATIONS

J. Miller, O. Onar, C. White, S. Campbell, C. Coomer, L. Seiber, R. Sepe, Jr., and A. Steyerl, "Demonstrating Dynamic Wireless Charging of an Electric Vehicle," IEEE Power Electronics Magazine, Mar. 2014, pp. 12-24.

\* cited by examiner

OPTO-INDUCTIVE COUPLING SYSTEM AND METHOD FOR WIRELESS CHARGING AND DATA COMMUNICATIONS

CROSS REFERENCE TO RELATED APPLICATIONS

This application is a continuation of PCT Application No. PCT/US18/49912, filed on Sep. 7, 2018, which claims priority to U.S. Provisional Application No. 62/556,332, filed on Sep. 8, 2017, both of which are hereby incorporated herein by reference.

BACKGROUND

The present invention relates generally to contactless charging, and more specifically to devices, systems and methods related to smart batteries, battery management systems and fast charging processes utilizing inductive and optical coupling elements.

There is prior work describing mechanisms of wireless energy transfer between a power source with its transmitter inductive coils and a receiver part with its inductive coils usually attached to some energy sink or load and/or batteries to be recharged through the transmitted energy process. Such systems typically use some type of radio frequency modulation scheme for feedback control, controlling the transmitted energy inflow to the receiver system within adequate reference levels in several load transients and/or battery states of charge situations. Usually radio frequency modulation schemes involve modulating the oscillating coil waves or using other RF external modulation such as the Bluetooth standard. These methods involve circuits and elements for the modulation and demodulation and their conversion to digital numeric values, requiring digital processing elements, such as microcontrollers or processors, to interpret the data and act upon specific control variables.

The approach of modulation-demodulation conversion and digital processing of the information has as fundamental drawback: the speed of response or responsiveness of the system, with control feedback signals delays in range of 50 milliseconds to several hundred milliseconds. These response times are not suitable for dynamic recharging scenarios such as cars, robots or other electric vehicles that need to wirelessly recharge their batteries while in motion, for example, moving on recharging lanes. Moreover, fast and ultra-fast battery recharging rates require very tight current control under transients. For example, when an electric vehicle or robot is charging its batteries, they act as large energy accumulators absorbing or delivering energy, and acting as capacitor filter banks. But when battery management systems or other electric protection circuit detect that the battery is fully charged, discharged, or any overcharge has occurred, they are disconnected from main power rails. This phenomena can occur for example in regenerative braking systems, where energy generated when braking a vehicle recharges the battery. When batteries are fully recharged and/or the vehicle transits though a long descent, for example, the battery management system (BMS) will detect an overcharge condition, and will disconnect the battery from the main bus. These battery connections or disconnections from main power bus occur in the switching time of semiconductor power devices, such as at sub-microsecond time frames. If the wireless recharging system doesn't react fast enough to these transients, very problematic instabilities can occur, for example overcharging the main bus voltage, producing system resets or even complete system failures and shutdown.

Precisely reaching (as close as possible to) the maximum current rates recommended by lithium-ion manufacturers needs a precise and fast control. Even rates slightly higher than those recommended can produce damage to cells, while lower rates will not produce the fastest recharge times allowed. Rapid variations in temperature, cell absorption or state of charge need fast responses to adapt precisely to the maximum current recommended at each moment. Other important events that need fast transient response are battery recharging limits cutoffs or discontinuities produced by BMS or other internal power security switches or disruptors that can act at any moment if an overcurrent, overcharge or other problem is detected, disconnecting the battery pack from the power rails. High voltage spikes, overcharging or systems shutdowns can occur because of the low response times.

Robots, drones, or electric vehicles can be turned on, operating or in standby mode while they are on a recharging station. When batteries are fully charged, they do not act as capacitor banks absorbing all the energy transferred. In those cases, the energy provided by the wireless charging station goes directly to the load, and devices' loads can show enormous transients and non-linearities. If the wireless recharging station does not react fast enough to provide energy to cover load transients, part of the energy would be delivered to the batteries, deteriorating their cells due to unnecessary cycling.

In U.S. Patent Application Publication No. 2017/0141612, an optical link is used for establishing the orientation of a wireless power transmitter. However, the application does not describe an ultra-fast control scheme, apparatus or software. Moreover, it does not teach a method based on a opto-induction matrix surface alignment with a wireless charging optimization. US Patent Application Publication No. 2013/0119929 mentions an 'optical link' for wireless transfer, however the underlying optical actuation method on the transmitter circuit is not described and no fast control loop based on optical communications is depicted or any apparatus showing arrays of coils and/or any optical photo-emitters and receivers pairs for alignment, control and data communications in the same interface. U.S. Patent Application Publication No. 2016/0311329 discloses a wireless energy transfer control scheme in which an optical control loop and a control system on the energy receiving side, a pair of inductive coils are controlled to transfer energy. It does not describe arrays of coils and/or any optical photo-emitters and receivers pairs for alignment, control and data communications in the same interface.

DETAILED DESCRIPTION

Figure 1:
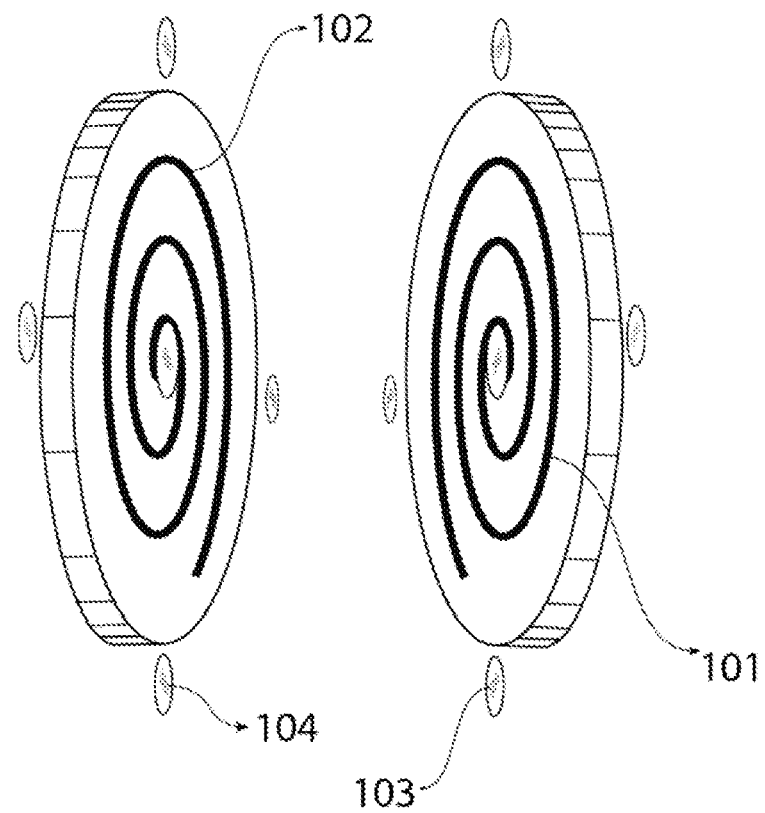
FIG. 1 illustrates coil-ferrite photoemitter and photoreceiver elements of embodiments of the wireless transmission system disclosed.

Embodiments of the present invention comprises a method and apparatus based in an opto-inductive control loop, for ultra-fast wireless recharging batteries or powering applications or any other application for which fast response to load transients are a necessity. Embodiments utilize a way of optically activating only aligned coils in wide charging surfaces constituted by coil matrices, allowing charge and optical communication of different devices placed on top of the active surface.

Applications of the technology include, but are not limited to, ultra-fast wireless charging and/or powering for static medium power home appliances, like PC or laptop computers, over active charging surfaces, embedded in tables or other furniture's and/or charging mats. These active charging surfaces can wirelessly recharge several different devices simultaneously at high recharging rates while on top of it, and can communicate data through the same optical interface. Embodiments of the invention provide a charging solution and a fast communication hub, without radiofrequency contamination and network saturation and/or delays. For many types of ordinary devices, this aspect can be important for the rapid internet of things expansion.

Also, having a wireless charging fast control, an alignment method for wide surfaces and data communications on the same interface provides an effective way for distributed energy systems to use peer-to-peer transactions, blockchain or similar technology. Pay per use charging surfaces located in commercial centers, airports and other public spaces can communicate optically with the user device above it, (smartphone, notebook, or any other battery operated device) and negotiate and agree for energy transfers based on recharging rates, amount of energy to be transferred, carry out the digital micro-transaction and activate the wireless energy transfer, all using the same interface. Pay per use could be per transaction, per amount of energy exchanged or other. In such an embodiment embedded optical elements are used for energy control as well as data communications between the mobile unit and a host system.

Fast and ultra-fast charging and powering electric vehicles, industrial robots, electrical forklifts and/or other heavy electric machinery, electric robotized vacuum pumps, lawn mowers and other home robots through static, or non-dynamic, wireless charging base stations and/or wireless docking stations. The static wireless base station is also applicable to aerial vehicles like unmanned aerial vehicles of all weights and sizes and manned, electric aerial transports.

Other applications include marine and port applications, such as electrifying moored vessels through wireless charging, marine surface and submarine vehicles and robot charging and powering.

Dynamic applications include fast and ultra-fast recharge and powering electric vehicles, such as cars buses and other terrestrial vehicles, while in motion through recharging lanes. Also, electric industrial vehicles and robots can be ultra-fast recharged and powered while in motion through recharging lanes or lateral surfaces. Aerial unmanned or manned vehicles can recharge their systems while moving near charging active surfaces or structures such as rings, arcs, or tunnels.

An embodiment of the invention presents a complete opto-induction ultra-fast wireless energy charging system, method and software, centralized and controlled by a battery management system (BMS) with charger functionalities. In U.S. Patent Application Publication No. 2016/0311329, incorporated herein by reference, a system is depicted, including a BMS acting with a charger functionality, with a detailed description of the BMS-Charger (C-BMS). Embodiments of the present invention includes a fast optical control loop and a control algorithm and a novel application for extending the charging method to larger active surfaces with integrated optical data communications in the same interface.

Figure 2:
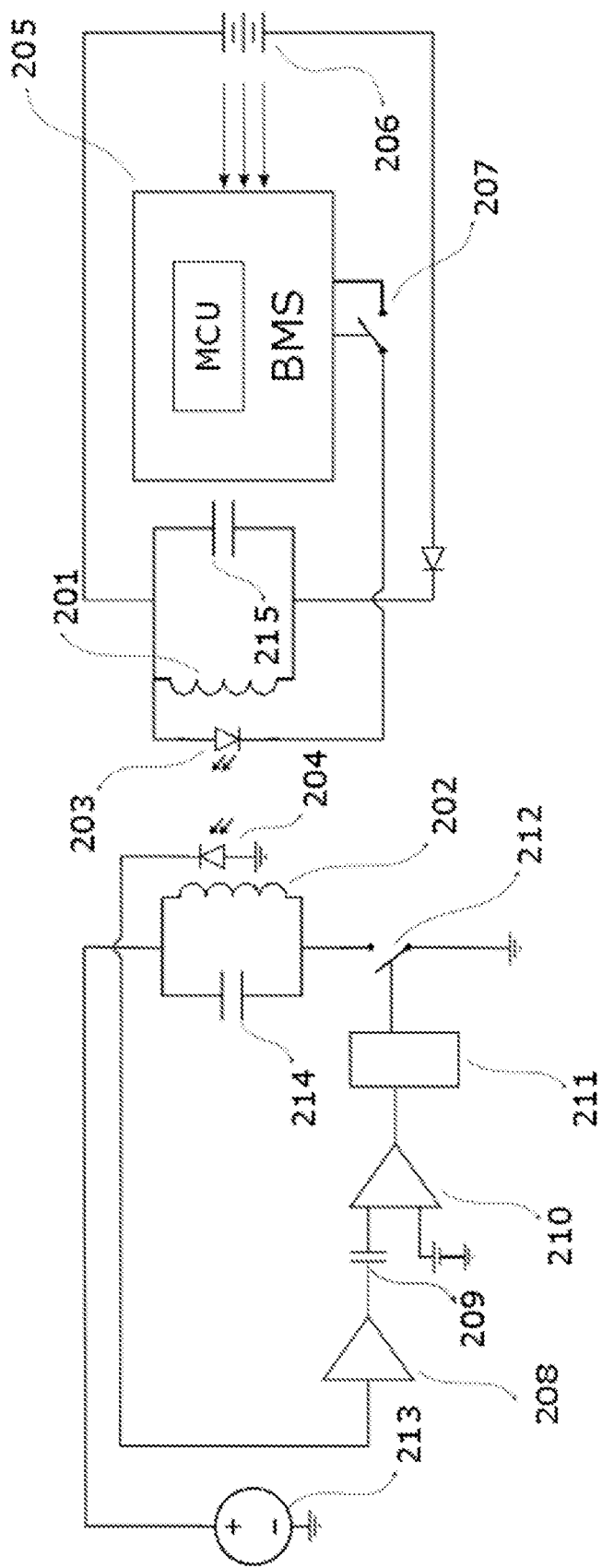
FIG. 2 illustrates a circuit of an embodiment of the single wireless system ultra-fast charging system.

The hardware configuration of embodiments of the system is depicted in FIG. 1 and FIG. 2. In an embodiment, the wireless recharging system comprises a wireless coil and ferrite transmitter 102 with a parallel capacitor, and its associated photodetectors 104, capable of detecting high frequency optical pulses, a wireless coil and ferrite receiver 101 with a parallel capacitor, and its associated photoemitters 103, capable of emitting high frequency optical pulses. In FIG. 2 ferrite transmitter is shown as 202 with associated photodetector 204 and ferrite receiver 201 with associated photoemitter 203. A main DC power supply 213 acting as the power source from which the energy will be transferred to the batteries 206 through the wireless receiving hardware.

The C-BMS 205 is internally connected to the battery cells 206 and its main power terminals, accurately measure the voltage of each cell, the charge current and the discharge or load current and the temperature of the battery through precise instrumentation. In alternative embodiments, there may be no batteries present and the receiver inductive coils 201 may be directly coupled to a capacitor array or directly to a load device.

To control the charging current, once the objective value of current is set through an input command or by the internal running algorithm, the C-BMS processing element activates or deactivates a switching electronic device 207 letting current to inflow to the photo transmitter element 203, a LED or laser infrared light transmitting optical pulses to the photodetector 204 in wireless power transmitter side or primary side, connected to a direct current DC power supply 213. In an embodiment, the photodetector 204 on the primary side is a PIN diode which accurately detects the high frequency band generated by the photoemitter 203 in the wireless receiver side or secondary side.

The light pulses detected by the photodetector 204 are amplified by an electronic signal amplifier 208, filtered by a decoupling capacitor 209 and compared to a reference level voltage by a fast-electronic comparator 210. The output signal form the comparator 210 is fed into the transistor driver 211 which activates or deactivates a power transistor 212 to its conduction state. This transistor 212 in an embodiment, is a high voltage MOSFET, SIC or GaN transistor. When the transistor 212 is in the conduction state, a linear current increment is produced between the coil 202 terminals, one connected to the positive power supply terminal and the other to ground trough the small resistance of the MOSFET transistor. When the transistor is in OFF state, the coil-capacitor tank circuit is disconnected from ground, and the energy accumulated in the coil, starts to flow to and from the parallel capacitor 214, generating an oscillation which transmits energy to the secondary side. As it can be seen in the circuit, light pulses from LED, laser or other fast switching capable photo transmitter elements are directly driving the switching of the power transistor 212 which in turn controls the energizing periods of the coil-ferrite-capacitor tank. The receiver part is completely an analog circuit, with amplification, signal conditioning and transistor driving, directly acting over the power inductive-capacitive arrangement.

The filter series capacitor 209 has an important function; it blocks excessive long period activation signals, which could overcharge the power stage coil, uncoupling the power stage from the optical receiver. In some embodiments, there is no battery management system (BMS) involved in the control of switching device 207 because the receiving coil 201 is coupled to a load device without the use of batteries to storage charge. Alternatively there may be batteries in the overall system but the control of switching device 207 could be done based on the regulated supply of a generated output voltage without regard to a specific battery conditions.

Figure 3:
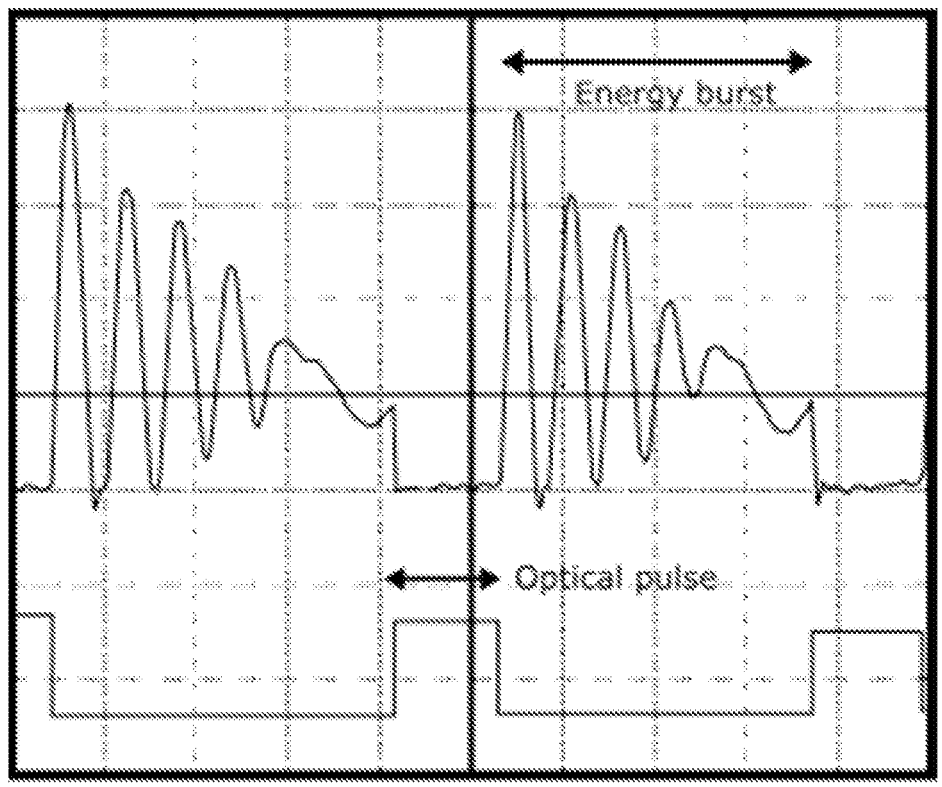
FIG. 3 illustrates a time window of optical pulses and energy burst oscillations.
Figure 4:
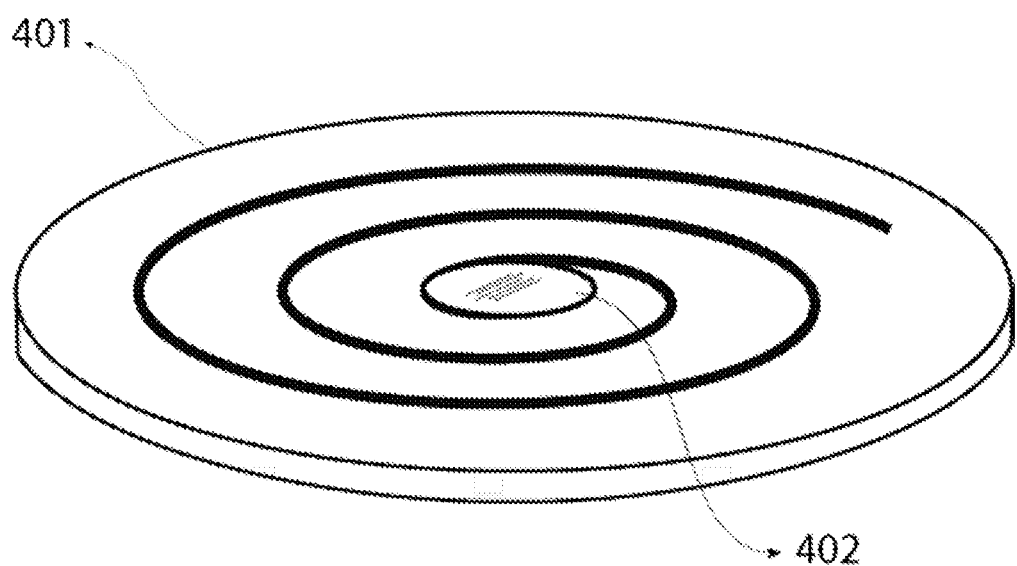
FIG. 4 illustrates an embodiment of the invention with planar coils to increase the capacitive energy transmission effect.

When the optical transmitted pulse is in the ON state, the power switch 212 is in the conduction state, energizing the coil and ferrite elements 202 linearly within the ON period. When the pulse changes its state to the OFF state, the power switch consequently changes also to a non-conducting or open state, leaving the coil capacitor tank circuit floating. Depending on capacitance values, the energy fluctuations between coil and capacitor can produce high voltage and currents oscillations which, by a near field induction mechanism, transmit energy to a near couple tank circuit. In an embodiment of the invention, the coil-ferrite and capacitor tank circuit is tuned to have it main oscillation frequency at approximately 250 kHz and peak voltages of approximately 500V. FIG. 3 illustrates the energy oscillations in an embodiment. In other embodiments, where regulations of electric compatibility allow higher frequencies of up to 500 kHz, different tuning arrangements of coil-capacitor can be used. In those arrangements, with possible voltages above 1000V and higher frequencies, allowed by SIC, GaN or other high voltage high frequency switching devices, a planar design of coils and ferrite shapes produces a capacitive coupling with electric field energy transmission summed to the magnetic field inductive effect, due to the high voltage, high frequency oscillations, improving efficiency and allowing faster charging rates. FIG. 4 illustrates such an embodiment with planar coil 401 and optical element 402.

Controllability and Response Time

The energy management, measuring and processing elements are in the secondary side, the wireless power reception side, which makes the primary side connected to the main DC power source into a simple slave, which is all analog, and a fast reacting wireless power transmitting source. Thus, the current charging rate values, different battery configurations, voltages and powers can be programmed and managed from the secondary side, the same side of the electric vehicle or robot that carry the battery system and C-BMS allowing the wireless transmitting base station being a universal charging device for vehicles or robots, even those with different batteries sizes, and different values of maximum voltages and/or powers.

As the FIG. 2 circuit shows, each optical pulse transmitted by the photoemitter 203 and controlled directly by the wireless receiver processor C-BMS 205 is received by the photoreceptor 204 of the wireless transmitter, generating an energy burst as a response (see FIG. 3). Incrementing the optical pulse ON state, increments the initial coil energy accumulation, generating bigger oscillation amplitude. Modifying the pulse period, the number of energy bursts transmitted by unit of time will vary accordingly, having a very effective and precise quantitative method to control the amount of energy density transmitted.

In an embodiment, optical pulses are generated within a period of T≅20 µs as illustrated in FIG. 3 and the burst of energy generated can be quantified within this period T. This means that a software implementation fast enough to read the charging current, process the information and generate an optical pulse variation as a response within approximately 20 µs or less allows for the controllability of the system to produce negligible current variations. When the C-BMS analog to digital conversion and processing power and software is fast enough, and the coil-capacitor resonance is adapted, these times can be reduced further. This means that in contrast to Qi standard or other present wireless modulation systems which have control response times much longer in the range of approximately in the range of 50 ms, embodiments of the present invention have a transient response time improvement of on the order of 2500 times. In some embodiments, the period of T is in the range of 10 to 100 microseconds. In alternative embodiments the period of T can be relaxed to be slower than 100 microseconds when a fast transient response time is not needed.

Such fast transient responses are useful for several applications, such as ultrafast recharging batteries wirelessly. Ultrafast recharging is enabled by the precisely controlling the charging currents flowing to batteries at very close to the maximum rates recommended by manufacturers within very small error margins and as a function of temperature, state of charge, state of health and other possible rapid changing variables through the process.

Charging rates are characterized by Battery University (batteryuniversity.com/learn/article/ultra-fast chargers) according to the following table:

| Type | Chemistry | C rate | Time | Temp. | Charge termination |
| --- | --- | --- | --- | --- | --- |
| Slow charger | NiCd Lead acid | 0.1 C | 14 h | 0° C. to 45° C. | Continuous low charge or fixed timer. Subject to overcharge. Remove battery when charged. |
| Rapid charger | NiCd, NiMH, Li-ion | 0.3-0.5 C | 3-6 h | 10° C. to 45° C. | Senses battery by voltage, current, temperature and time-out timer. |
| Fast charger | NiCd, NiMH, Li-ion | 1 C | 1 h+ | 10° C. to 45° C. | Same as a rapid charger with faster service. |
| Ultra-fast charger | Li-ion, NiCd, NiMH | 1-10 C | 10-60 min. | 10° C. to 45° C. | Applies ultra-fast charge to 70% SoC; limited to specialty batteries. |

Fast transient response also allows for fast reaction to transients to avoid damage and failures. In particular, embodiments of the invention allow an ultra-fast wireless charging powering method to be robust and safe, capable of reacting fast enough to battery disconnections from the main power bus to avoid over-voltage spikes and/or under-voltage transients to the load. Because embodiments of the invention will allows for reacting time on the order of microsecond time frames, if such a battery disconnection occurs, over-voltage spikes or low powering scenarios are avoided.

Fast response also allows for powering systems without batteries. For example, embodiments of the invention provide a method to wirelessly power on systems without the batteries connected to the main power rails. As the systems react in the microsecond time scale, it delivers energy to an electrical system efficiently even in presence of fast load transients and energy demand variations. The said characteristic allows electrical vehicles or robots to be always-on or in stand-by state while being powered by a wireless power source.

Dynamic Charging

Electric vehicles and automatic systems such as robots or drones are employed in an increasing number of application fields, hence recharging the system while in movement will be a highly desired.

At present time, there are proposals and projects to create charging lanes in roads for electric vehicles, for example the article "Demonstrating Dynamic Wireless Charging of an Electric Vehicle: The Benefit of Electrochemical Capacitor Smoothing" by M. Miller et al. states that "The wireless charging of an electric vehicle (EV) while it is in motion presents challenges in terms of low-latency communications for roadway coil excitation sequencing and maintenance of lateral alignment, plus the need for power-flow smoothing." In this article big capacitor or batteries banks are used to accommodate communication latency and alignment problems. Both issues are solved in embodiments of the present invention.

Charging lanes can also be useful in powering or controlling robots moving in industrial, warehouses or other types of large installations. Wirelessly charging electric vehicles, robots, drones or other industrial machinery while moving, need fast response systems and software, with also a good alignment tool. Embodiments of the present invention present solutions to these fundamental issues.

Figure 12:
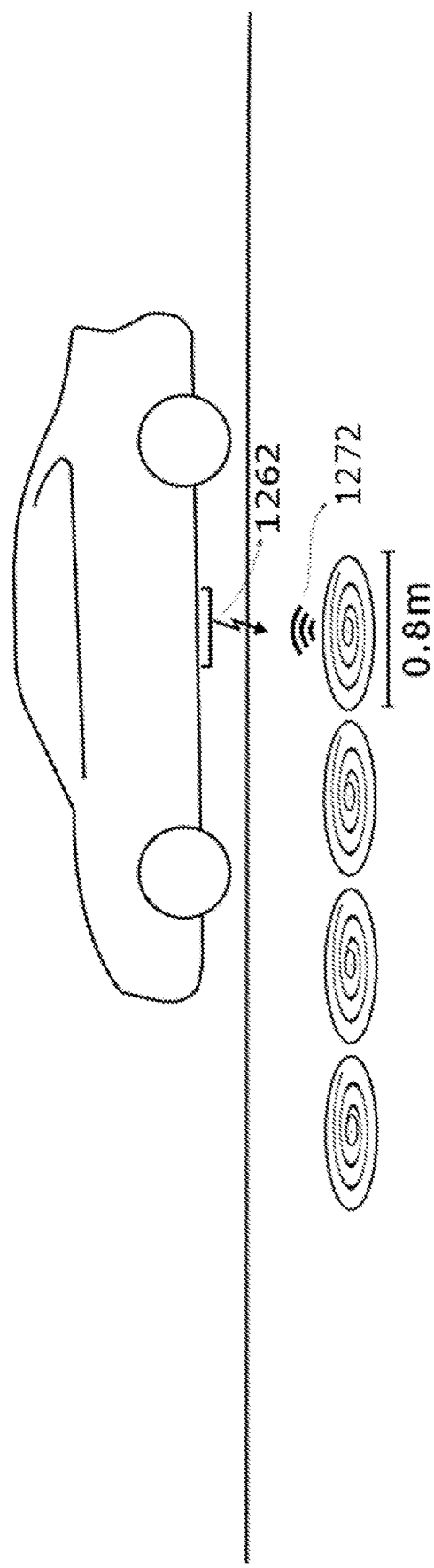
FIG. 12 illustrates an embodiment of dynamic wireless recharging of a moving vehicle.

An electric vehicle moving at 100 km/h (62 mph, 28 m/s) would be over an 80 cm diameter wireless disc's active area for about 29 ms. FIG. 12 illustrates a moving vehicle with photoemitter/ferrite receiver assembly 1262 temporarily over 80 cm photdetector/ferrite transmitter assembly 1272. Present methods of communication, modulation-demodulation, digitalizing and processing to control current, which operate in the range of 50 ms to 300 ms, are not fast enough to activate and efficiently control the power rate from the aligned facing coil disc at such a rate. However, embodiments of the invention with its fast reaction method in the time scale of tens or hundreds of microseconds activates and adjusts several energy bursts, controlling the current charging rate while moving and passing form one receiving coil to others. Thus embodiments of the present invention can accommodate charging of vehicles moving at a rate of 10 meters or second or faster, which is not achievable with other solutions.

Another problem with traditional modulated RF signals is that several surrounding coils can receive the communication. With a laser or focused light beam pulses only the aligned facing coils are precisely activated, even at very high speeds, transmitting energy more efficiently.

Optical Active Area Extension for Easier and Faster Alignment

Laser, LED or other type of light pulses can be arranged in several photoemitter devices which, in combination with several photodetection elements, can extend the active emission/detection optical area. See FIG. 5, which illustrates an extended optical window with assembly 501, additional optical elements 502 and optical filter 518. The photoemitter and photoreceptor elements can work in the non-visible light spectrum, such as infrared, to avoid being activated by other light sources. Optical filters 518 such as glass, plastic or other materials, can be placed on top of the wireless power transmitter and/or receiver surfaces to mechanically protect them and optically transmit only desired spectrum. In an embodiment, the LED or laser photoemitter, and the PIN diode photoreceiver work in the same infra-red band, thus, the protection filter glass or plastic film can be black to visible light spectrum and transparent only to the said infrared spectrum band. This glass or plastic film apart of acting as a surface protection and optical filter, can act as a light diffusing element, to increase the active optical surface detection from a point source to a non-point (diffuse) light.

Figure 16:
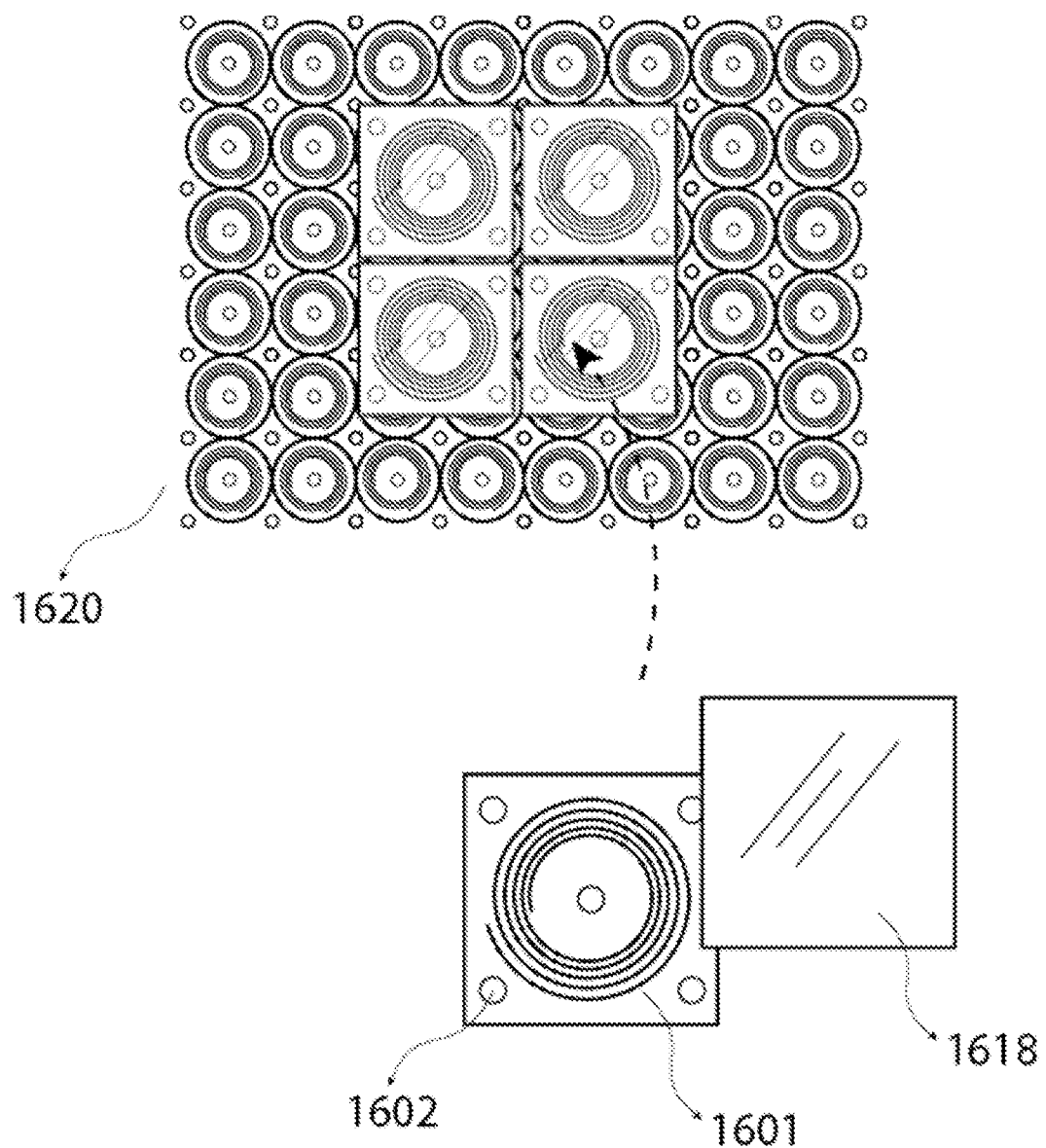
FIG. 16 illustrates a tile matrix arrangement with different sizes of receiver tiles and transmitter tiles.

FIG. 16 shows an embodiment of the extended optical window assembly (1601) for opto-inductive elements in the static surface (energy transmitter, 1620) smaller than the receiver (mobile unit), also with optical elements 1602 and optical filters 1608.

Active Opto-Inductive Charging Surfaces with Integrated Data Communications

Some applications may need extended wireless charging surfaces to improve coil alignment over wide areas. Wireless charging surfaces or mats can be useful, for example, in home appliances with transmission of wireless energy in wide surfaces. Integrating or adding these charging surfaces to tables, floor or walls would allow recharging any electrical or electronic device placed on top of these active surfaces or hanged in a wall with said active recharging surface. As each device on top of the charging and communicating surface can control its own power inlet, multiple devices with different power requirements can be charged simultaneously while laying on top of the said active surface, and communicate digital data information through the same optical interface to the surface hub, that can be connected to other devices, networks or to Internet.

In other embodiments, wireless recharging surfaces are used as ultra-fast recharging landing stations for unmanned or manned electrical aerial vehicles. Dynamic charging electrical vehicles or robots while in motion on charging lanes with high degrees of positioning freedom can be used in other embodiments of the invention.

An optical pulse alignment mechanism is used in an embodiment, to efficiently activate only the facing coils in a wide array of opto-induction wireless transmitting elements to extend the wireless recharging active surface. If a large enough number of small coil ferrites and photoreceiver elements are embedded in a flexible material, the active surface can be a flexible mat for easier manipulation and installation.

Figure 6:
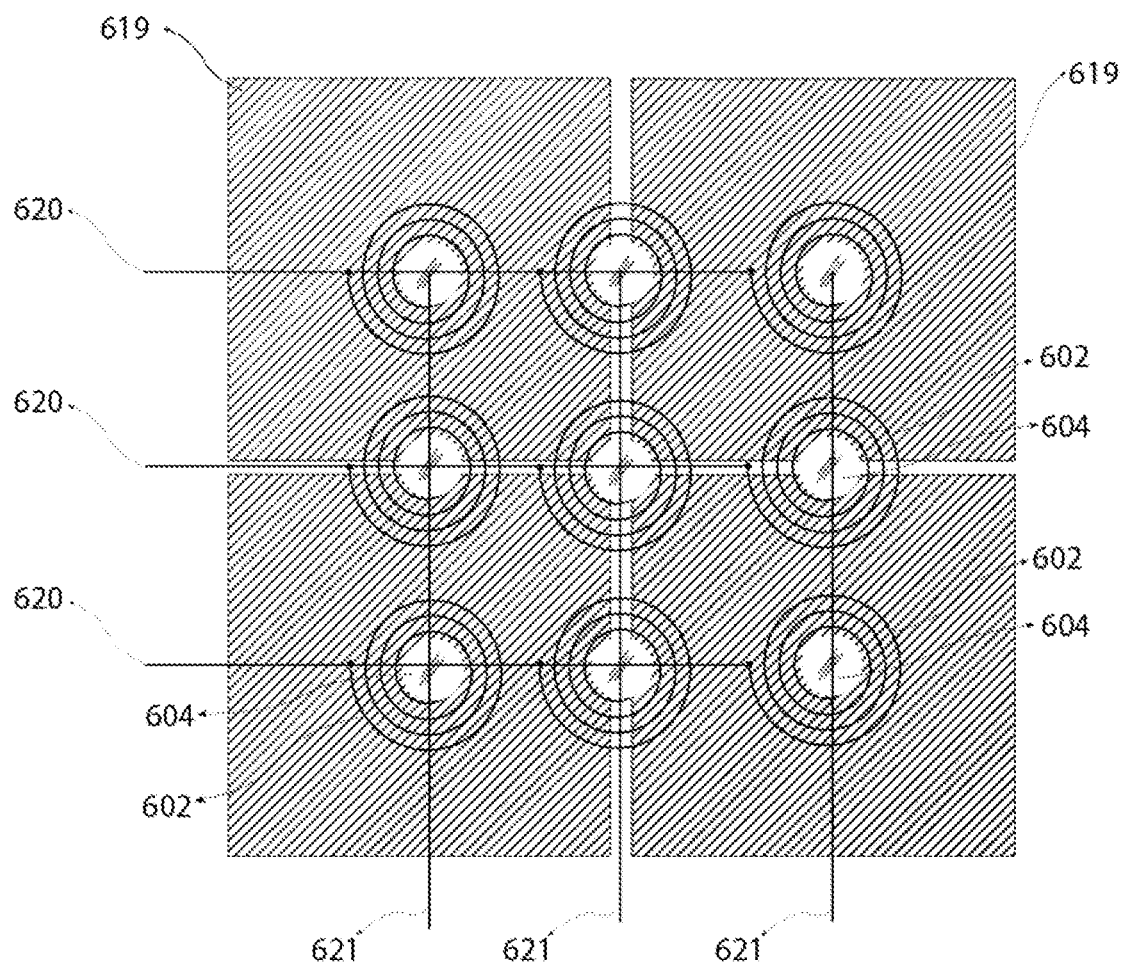
FIG. 6 illustrates an embodiment of the invention for an extended wireless transmitter surface.

An embodiment of the invention for an extended wireless transmitter surface is depicted in FIG. 6. These surfaces are composed by an inductor array 602, an optical photoreceiver array 604 and a soft ferrite tile array 619. In a two-dimensional top view, each tile has a coil and photoreceiver element at: 1. the center of the tile; 2 the middle point of each side; and 3. the vertices.

Each coil can be considered to have a positive and a negative terminal. All positive coil terminals in a row are connected in parallel through a power bar, designated positive power bar 620. All negative coil terminals in a column are connected in parallel through a power bar, designated negative power bar 621. Different positive bar rows, and negative power bar columns are not interconnected.

For a clearer depiction, the system will be divided in two layers by its function, the inductive-capacitive layer with its connections, and the optical photoreception matrix layer. Both layers are superposed in the actual system.

Coil-Capacitor Array Layer

Figure 7:
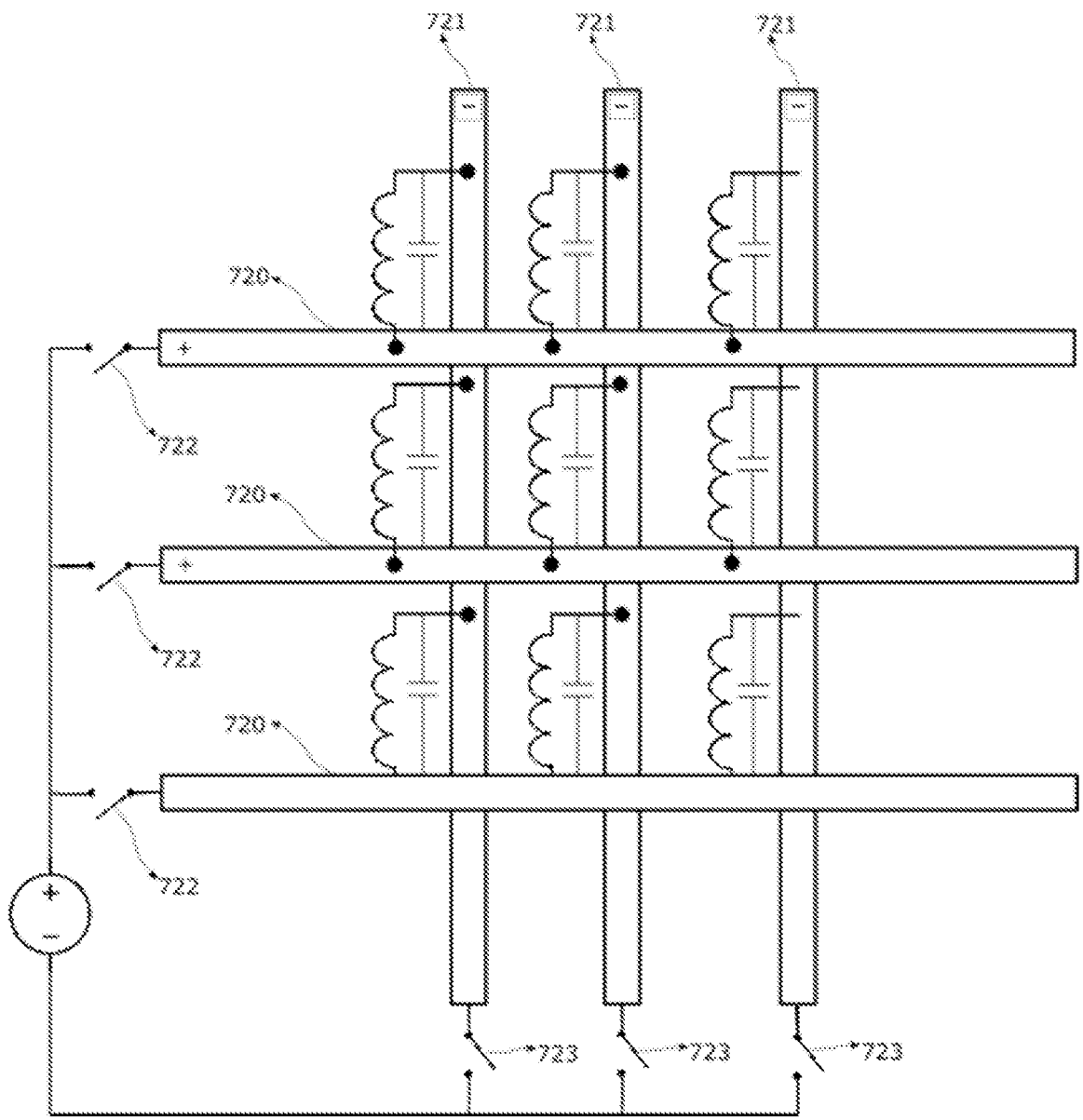
FIG. 7 illustrates a more detailed electrical diagram of the coil-capacitor array layer.

In FIG. 7, a more detailed electrical diagram of the coil-capacitor array layer is depicted, showing schematically their connections. Positive terminals of coils in the same row are connected in parallel by a conducting power bar 720. Said power bars are electrically connected to the positive terminal of a DC power source when its respective switch 722, a high side P-Channel MOSFET transistor in an embodiment, is set to ON conducting state. Negative terminals of coils in the same column are connected in parallel by a conducting power bar 721. Said power bars are electrically connected to the negative terminal of a DC power source when its respective switch 723, a low side N-Channel MOSFET transistor in an embodiment, is set to ON conducting state.

Figure 8:
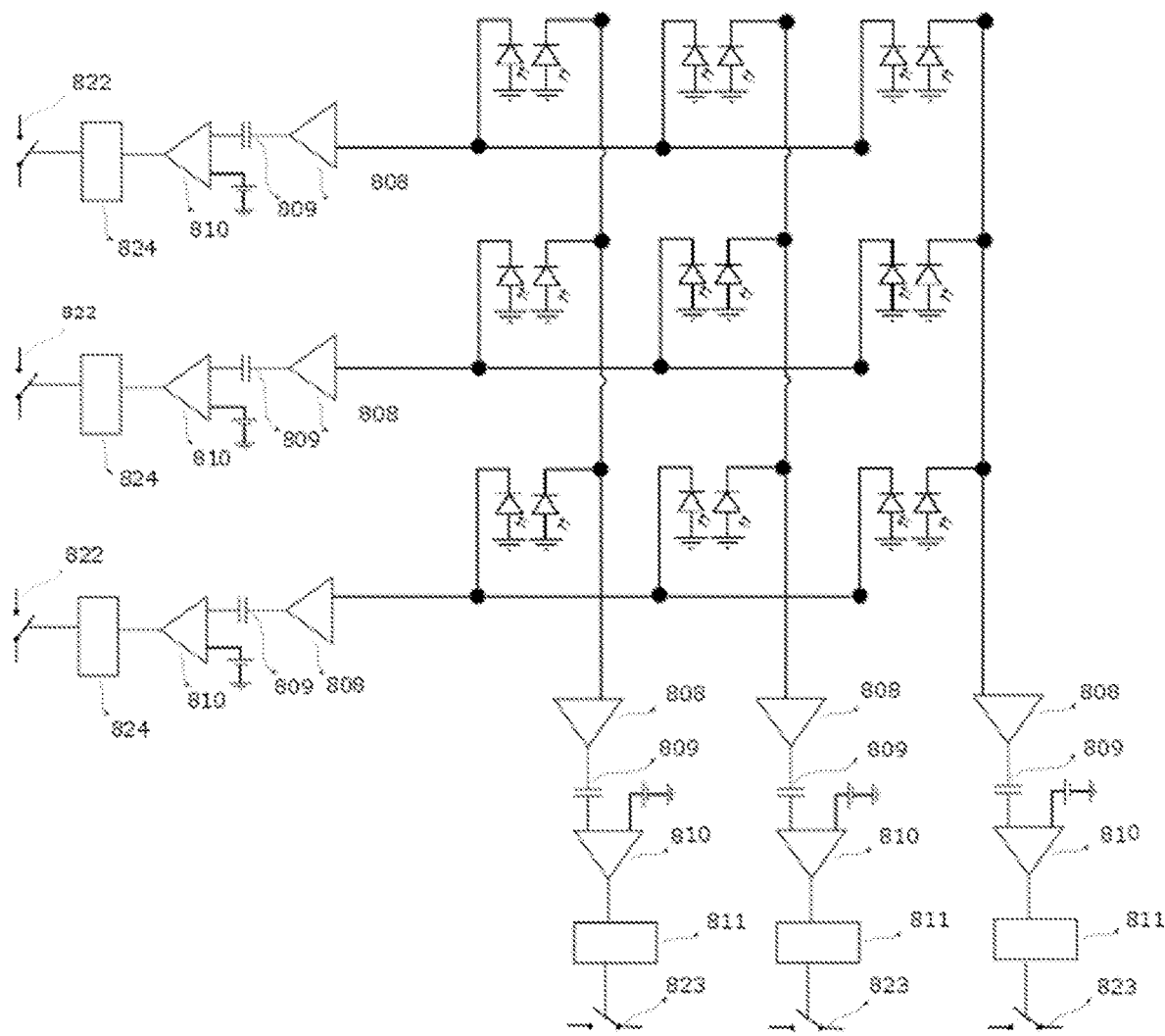
FIG. 8 illustrates a more detailed electrical diagram of an analog embodiment of the photoreceiver PIN diode array layer.
Figure 9:
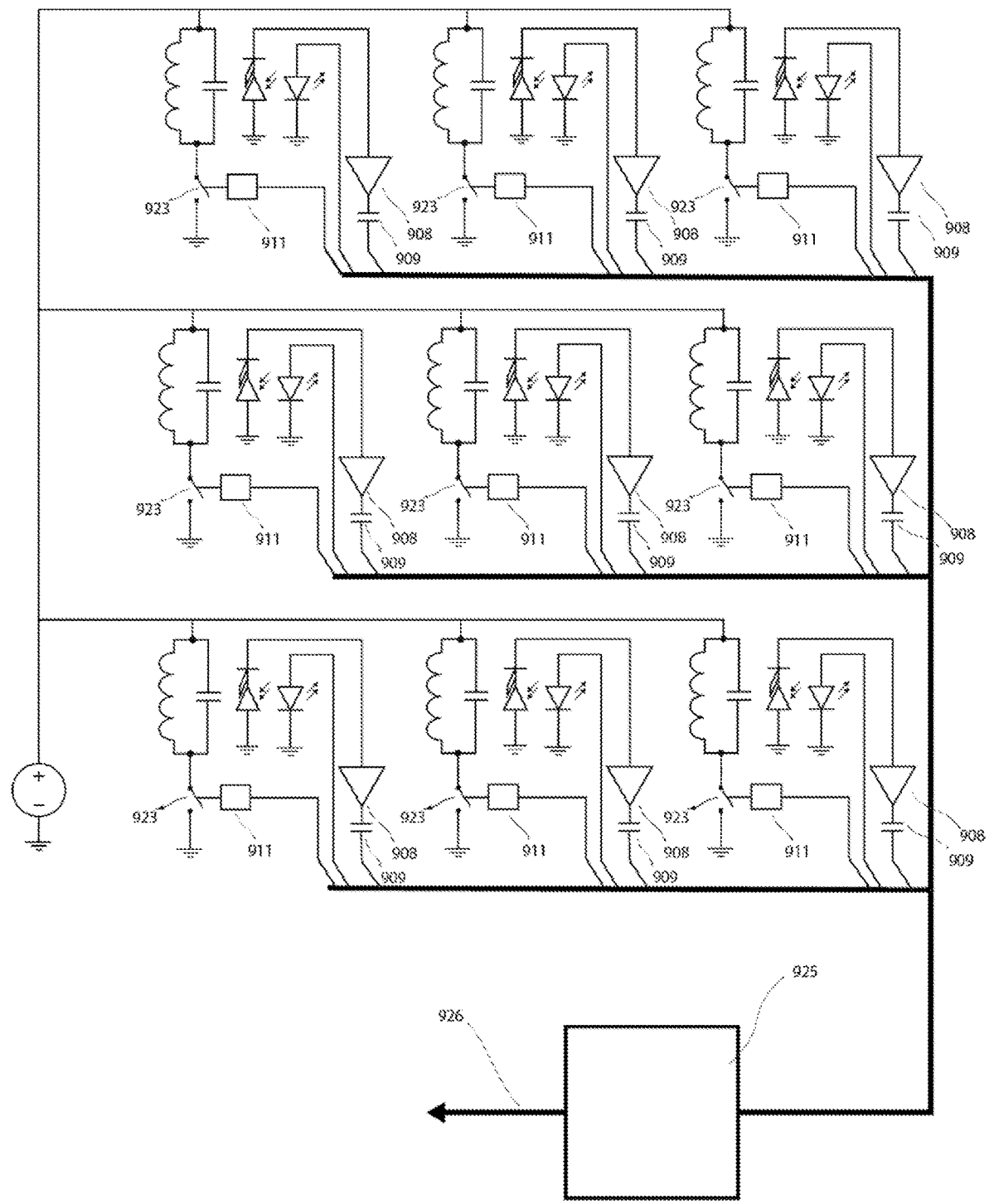
FIG. 9 illustrates a more detailed electrical diagram of a digital opto-inductive array embodiment for integrated optical data communications.

We provide two example implementations of the photoreceiver diode array layer, an analog embodiment in FIG. 8 and a digital embodiment in FIG. 9. The analog driver has lower cost, while the digital diver implementation allows for more flexibility and integrated communications.

Photoreceiver Diode Array Layer (Analog)

In FIG. 8, a more detailed electrical diagram of the photoreceiver PIN diode array layer is depicted, showing schematically its connections for the analog driver solution. In the disclosed matrix of opto-inductive elements, each photoreceiver element can be a pair of PIN diodes localized together in the center of the coils 604, with all anodes connected to ground and cathodes connected to a parallel 'row' node and to a parallel 'column' node respectively. Each one of these row or column nodes has at its extremes an analog amplifier 808, filtering 809, comparator 810 and transistor's gate driver control 811, 824 similar to the circuit described for a single opto-inductive system shown in FIG. 2. High side gate drivers 824 control the row P-CHANNEL transistors 822 while gate drivers 811 control the column P-CHANNEL transistors 823.

Photoreceiver Diode Array Layer (Digital)

In FIG. 9, a more detailed electrical diagram of the diode array layer is depicted, showing schematically its connections for the solution with integrated data communication in the same optical interface of the control loop. The embodiment of the wireless charging surface with integrated digital communications uses an intermediate digital processor to distinguish optical control signals from data communications and to activate the power switches.

This approach is analogous to the analog driver case, but instead of activating directly the power switches by means of a level comparator, signals in opto-inductive nodes are interpreted by a digital processor, which activates the respective power coils and decides through digital filters and a state machine algorithm if the optical signal is for wireless power control or data communications. The circuit of FIG. 9 also incorporates a power MOSFET for each inductive element rather than using row and column MOSFETSs, as described below.

Figure 10:
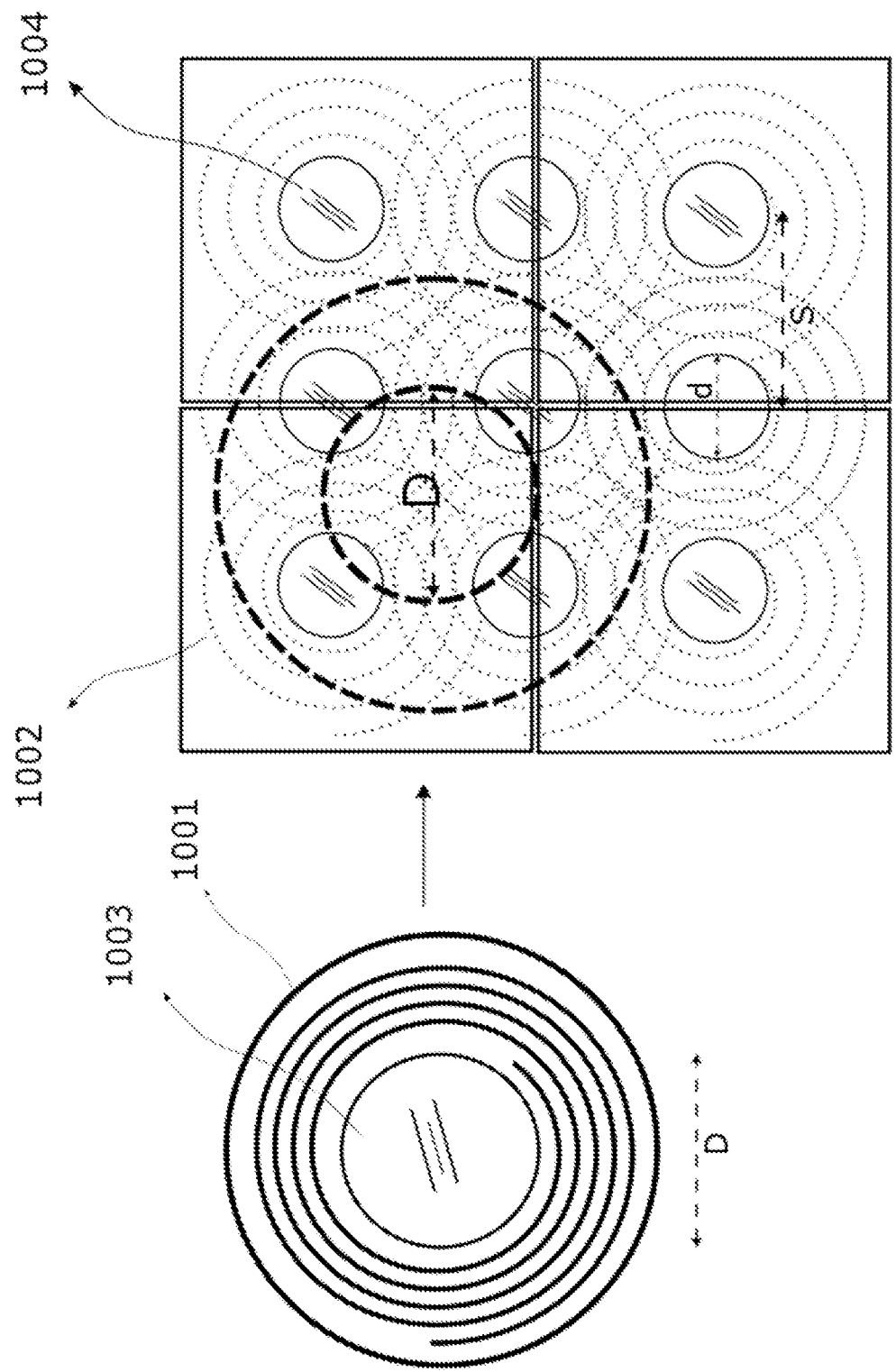
FIG. 10 illustrates an optical window size and array shape for ensuring detection and energy transmission.

The combined coil-capacitor array layer and photoreceiver PIN diode array layer work as follows. FIG. 10 illustrates inductive receiver 1001 and photoemmiter 1003 and array assembly with inductive transmitter 1002 and photodetector 1004. The optical window size of the photoemitter 1003 is the size of one or several photoemitter diodes in parallel with its glass or plastic protection filter or the size of the optical beam when arrives to the photodetector element. The minimum window size to assure the optical reception of some opto-induction disc in the wireless transmitter can be calculated considering the worst-case scenario where the opto-induction disc is centered in the largest empty space between optical receiver windows. In this worst-case scenario, if the opto-induction disc window of the optical transmitter has a diameter TY, where 'd' is the diameter of the optical window of each opto-induction disc of the power transmitter array and 'S' the space between each opto-induction disc at the power transmitter array, then if:

$$D > S\sqrt{2} - d$$

optical detection by at least one photodetector is ensured in any localization of the wireless transmitting surface. In practice, assuming a receive tile size range similar to the coil transmitter size, the maximum limit would be approximately the tile size. In alternative embodiments, there can be different tiles sizes between receiver and transmitter and multiple emitter receptions pairs. It can be appreciated that one of skill in the art can determine an optimum distribution, shape and solution to ensure that in any position at least one photoemitter is guaranteed to be received by at least one photodetector.

In a regular operation cycle, the opto-induction disk 1001 of the wireless receiver side sends an optical pulse through its optical window 1003. As described above, if the emitter window size has an adequate size, one or several opto-induction discs 1002 will detect the optical pulse through its optical window 1004. The optical receiver unit is formed by one or several of photoreceiver elements, PIN diodes in the preferred embodiment (a group of diodes connected in parallel may be needed for larger receiver windows). Each one of these diodes will generate a pulse current through the 'row' connected node and through the 'column' connected node respectively.

Referring to FIG. 8, after an analog signal conditioning, each row node in which a connected diode has generated an electric current signal, will activate its respective high side driver circuit 824, activating the high side P-Channel MOSFET transistor 822 to its conduction state. Similarly, after an analog signal conditioning, each column node in which a connected diode has generated an electric current signal, will activate its respective low side driver circuit 811, activating the low side N-Channel MOSFET transistor 823 to its conduction state.

When one or several row nodes activate their connected high side transistors, the relative positive power bar 820, will be connected to the positive terminal of the DC power source through the P-Channel power MOSFET transistor, connecting all the positive coil terminals and parallel capacitors also to the power supply positive voltage. At the same time, when one or several column nodes activate their connected low side transistors, the relative negative power bar 821, will be connected to the ground of the DC power source through the N-Channel power MOSFET transistor, connecting all the negative coil terminals and parallel capacitors also to the power supply ground.

The combined circuit energizes only the coil-capacitor tank circuits relative to the optical windows that receive light pulses, connecting them during the light pulse ON state period to the power source, and letting them oscillate freely once the pulse light is in its OFF state, being disconnected from the power source. An advantage of the circuit of FIG. 8 is lower cost and simplicity without using digital elements. The described system works with multiple devices and multiple coil activations of a single device if the activations don't have 'shadow' element in its columns AND rows. Thus, multiple devices can be charged if they have clear path on their columns OR Rows. For an array size of N cells, the circuit of FIG. 8 uses 2√N power MOSFETs. Alternative embodiments of an analog implementation such as FIG. 8 use an independent power MOSFET for each coil and therefore don't share row and column power bus bars. (See for example FIG. 9 discussed below.) Such an implementation uses N power MOSFETs for an array size of N cells, which increases cost for large arrays and the wiring cost may be additionally increased, but the advantage of such a system is that it can accommodate any arbitrary pattern of activation. Other embodiments are also possible that represent hybrid implementations between the fully independent MOSFETs and the shared row and column bus bars.

The process steps can be summarized as follows. A wireless receiver opto-induction disc 1001, or a plurality of them, start sending optical pulses to the wireless transmitted opto-induction surface, through its optical window transmitter 1003. Due to the size and distribution of the transmitter 1003 and receiver windows 1004, the wireless transmitter side will receive optical pulses in one or several optical window detectors 1004, independently of their relative position.

The specific wireless transmitter optical windows 1004 that detect light pulses through their photodetection elements activate their associated coil-capacitor circuits. During ON light pulses, the coil-capacitor tank circuit is connected to the DC power source through power transistor, energizing it. During the OFF light pulses, the previously energized coils are disconnected from the DC power supply, interchanging energy with the capacitor, oscillating and interchanging energy also with the wireless receiver circuit.

Controlling the ON light pulses time, the energy charged in the coils in each period is controlled. Controlling the OFF light pulse time, the energy bursts transmitted to the wireless receiver by unit of time, the energy density is controlled. The combined methods of above describe a fast and effective wireless charging control mechanism.

Referring to FIG. 9, in this embodiment with integrated optical communications, an array of diodes is distributed over the active charging solution in the center or near its respective coil. Each diode arrangement located in the center of a transmitter coil is connected to signal buses or nodes. A photodetector coupled to signal conditioning amplifier 908 and filter 909 which converts the detected optical pulses into defined electrical pulses that are transmitted to an FPGA and then to a microcontroller or directly to an integrated system-on-chip solution 925. This digital processor 925 can discern which areas of the charging surface are active (with an electric device on top of it) based on the detected pulses on specific rows and columns. The digital processor controls then the aligned coil power oscillations by activating their respective power switches 923 using drivers 911 based on the control pulses received in its inputs. Also co-located with each photodetector is an optical transmitter coupled to digital processor 925 to accommodate digital communication as described below. In alternative embodiments, a digital implementation can be used with row and column power MOSFETs, rather than a MOSFET for each coil, as discussed above in connection with FIG. 8.

In an embodiment, the digital processor can distinguish between optical control pulses and data communication by means of a digital filter. Data communication pulses are transmitted using frequencies above 1 MHz while power control pulses are transmitted at frequencies below 100 kHz. Also, as described below in the software description, the charging control software has a state machine algorithm that decides if the system is in data communication state or charging state. The digital communication data can be packetized and transmitted using a known protocol, such as TCP/IP over Ethernet, using the same SOC digital processor, and transmitted to an external port through a communication bus 926. Each wireless receptor device located in the charging consumer element (for example laptop computer) can have its own internal IP (or IPv6) to identify and distinguish between them in the communication with the exterior.

For bi-directional optical communications, an emitter light diode is located near the PIN receiver diode, conforming a dual diode pair, transmission and receiver at the wireless charging matrix side and the same dual diode configuration is implemented at the wireless energy reception side (electric device). The circuit connection matrix of these diodes is straightforward, as they are directly connected (through resistors and/or current amplifiers) to the digital processors of each side.

Figure 11:
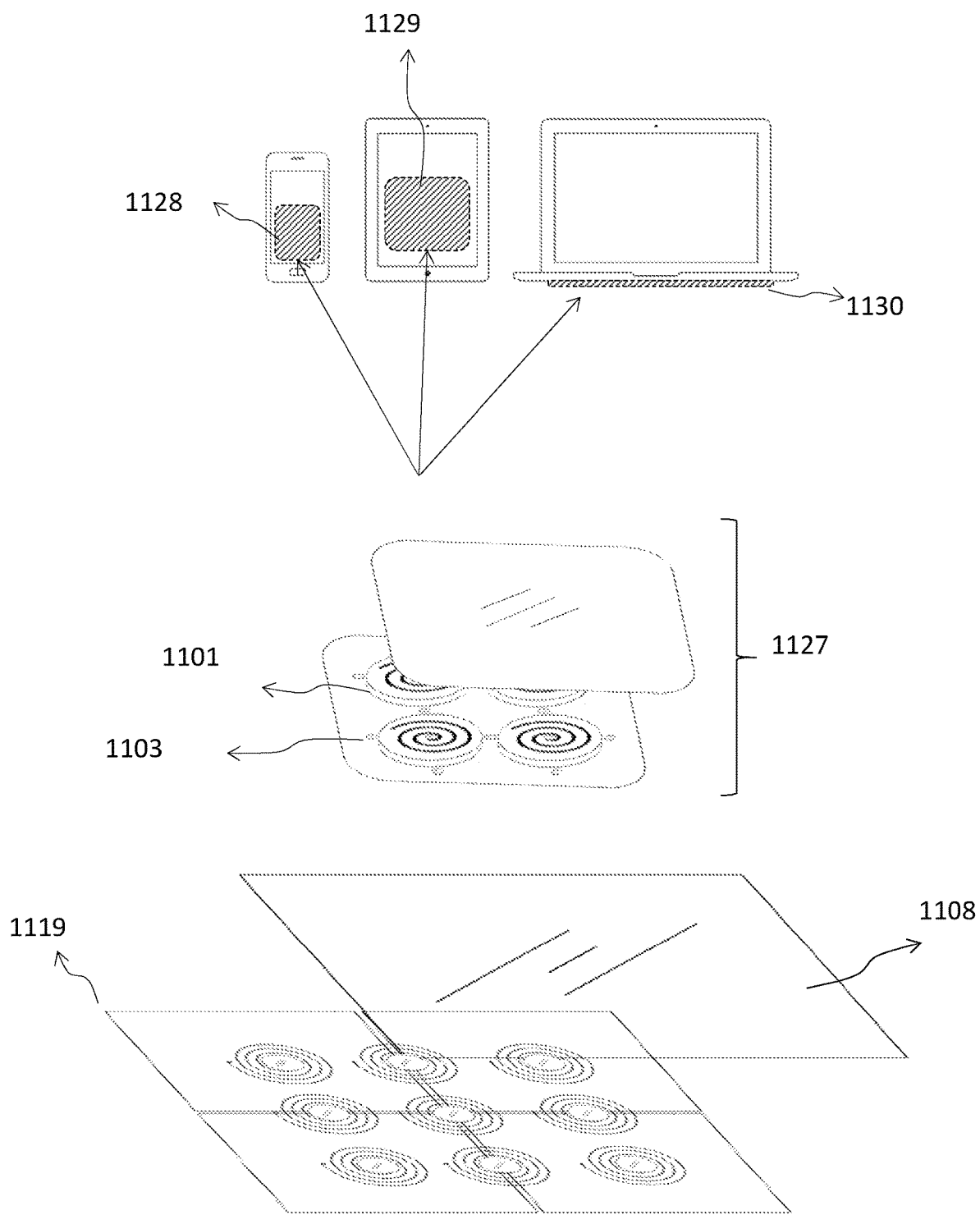
FIG. 11 illustrates an embodiment of the invention as a solution offering wireless charge and communications surface for different consumer products.

In an embodiment, the charging surface can be employed to wirelessly recharge several devices, as mobile phones, tablet computers, laptops or other electrical devices battery operated, as illustrated in FIG. 11. These charging surfaces can be placed in top of tables or other furniture or installed in home walls.

The wireless charging surfaces, composed by ferrite tiles 1119, transmitter coils 1002 receiver PIN diodes 1004 and emitter diodes for data communication, can be arranged in thin rectangular enclosures, and covered by a thin protection glass 1108 that can act also as a visible light filter transparent to infrared wavelengths or the spectrum band used by the photoemitters and photoreceptor elements. In a similar arrange, the receptions side device contain the reception coils 1101, transmitter diodes 1103, optional receiving diodes for data communication and ferrite tiles arranged in a thin enclosure 1127, also with a protective glass 1108 transparent only to infrared light or the wavelength used for the led pulsed communications. This reception devices, can be attached to the back side of the mobile phones or other electrical equipment 1128, 1129, 1130, or can be integrated to this electrical equipment in production.

Once the wireless reception device has been attached, the electric consumer equipment can be left on any place of the charging surface device, and their batteries will be recharged. Several of these devices can be simultaneously placed on top of the charging surface and by means of the opto-induction method, all the devices will be charged also concurrently recharged.

These devices can also communicate data to the charging surface with the same optical interface used for power control. This way, and effective internet of things (IoT) communications hub for several electric devices is disclosed, which at same time, can charge said devices.

Furniture as tables or home wall can include charging surfaces, providing a solution for easily charging multiple device batteries and at the same time communicating said devices between them, to internet or to other networks, all in a simple and energy efficient way, without radiofrequency or protocol saturations.

Figure 5:
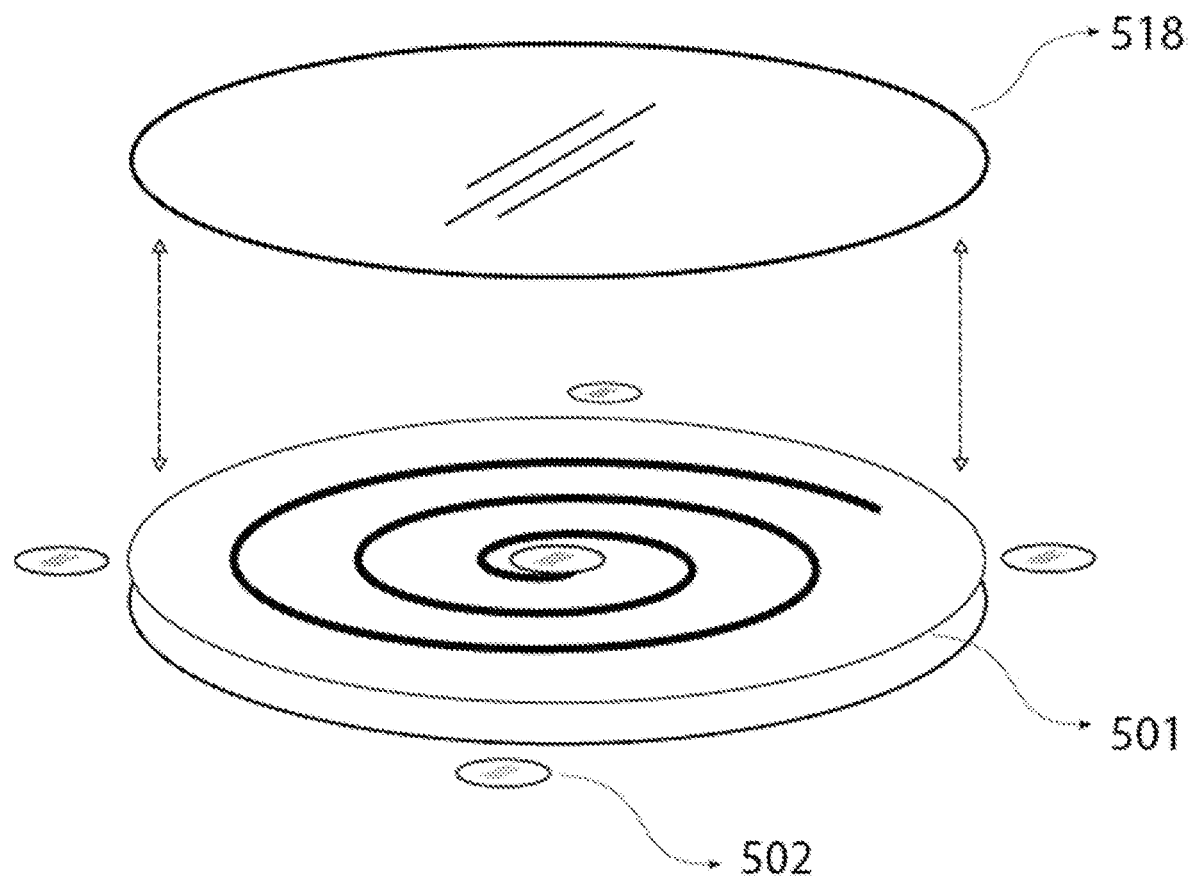
FIG. 5 illustrates an extended optical window and optical filter with protection.

Embodiments of the invention have been described above in connection with inductive transmitter coils and inductive receiver coils that are approximately the same size and with optical elements in the center of each coil. In alternative embodiments, other sizes and arrangements of coils and optical elements are possible. For example, in some embodiments the transmitter coils are composed in a 'smart surface' having a large number of smaller coils compared to a relatively larger coil or coils of the energy receiver (e.g. on the laptop side). FIG. 16 illustrates such an embodiment. In this case, the inductive receiver/optical transmitter side tiles 1601 illuminates a group of smaller inductive transmitter/optical receiver tiles 1620 that react in groups. In such an embodiment diodes in the inductive receiver tile could be diffused such as with glass 1618 so the whole tile 1601 would be uniformly illuminated by optical transmitter elements 1602. The inductive transmitter coils in proximity to the optical receiver elements illuminated by tile 1601 would be energized collectively in a group, forming an efficient coupling of inductive devices. Embodiments with optical elements in other locations around the coils such as shown in FIG. 1, FIG. 5 and FIG. 16 can be used to optimize the patterns in such embodiments.

As shown in FIG. 16, in some embodiments there can be multiple tiles on the inductive receiver/optical transmitter side. In some embodiments there is a two dimensional matrix of inductive receiving coils in the mobile unit just as in the stationary unit. In some embodiments the inductive transmitting tile matrix of the stationary surface could be very small, of micrometer scale, formed into thin flexible materials that are installed easily on different surfaces. Larger coils on mobile unit side compared to the stationary side generally results in less 'dead' zones. In some embodiments a basic size of inductive receiving tile is defined and different numbers of these tiles are used in a matrix depending on the size of the receiving area of the mobile device, which could vary in size (e.g. from a mobile phone, laptop, etc.).

Software

The optical pulses and the quantified energy oscillation bursts generated are an effective method and apparatus to achieve a fast, efficient and precise control method for near field wireless energy transmission, nonetheless to complete the feedback control loop, fast responding software may also be needed. There are a plurality of real time operating systems that can be used for the real-time software control loop. But as the systems is intended to be used even in low cost or low power computing embedded processors or microcontrollers, there may be tight constraints in terms of ultra-fast real time control requirements in the microsecond range and the use of embedded devices. Such devices typically have restricted memory and processor clock speeds but must be capable of running the battery management system functionalities, including the state-of-charge algorithms, and the charging control algorithm, all in real time.

To quickly and efficiently control the optical control loop for wireless charging and the battery management functions in embedded devices with restricted memories and processor capabilities, a state-space based software approach can be used. Embodiments of the invention present a fast method to control a battery management system and ultra-fast charger with a digital processor, useful for fast controlling other types of systems as well.

Real time operating systems normally rely on events and interruptions. These interruptions and sometimes nested interruptions make it difficult to guarantee latencies within determined range in different scenarios, something of fundamental importance for a mission critical systems as battery management and charging.

Ultra-fast charging and managing energy of a battery, needs to be tightly and quickly controlled in all scenarios. Worst case scenarios of real time operating systems can have latency uncertainties of up to hundreds of microseconds in a 100 Mhz processor, so a dedicated software controller may be needed as disclosed below.

Beyond the fast control mechanism needed for charging, the software must control the energy balancing of cells, calculate each cell energy stat-of-charge through an algorithm based on charge and discharge currents, temperature, precise voltage reading and cell state-of-health. To accomplish a robust, reliable and fast control software, a new strategy and approach has been developed.

At the lowest level, the system is described using a mathematical representation. Embodiments of the invention utilize multi-level state variable matrices and associated finite state machine intercommunication, at a multi-scale level, to approximate as close as possible to a dynamic state description of the systems and a finite state machine to control some of these state variables (recharging current, for example).

Multi-Scale State-Space with Finite-Sate-Machine (FSM) Representation

Figure 13:
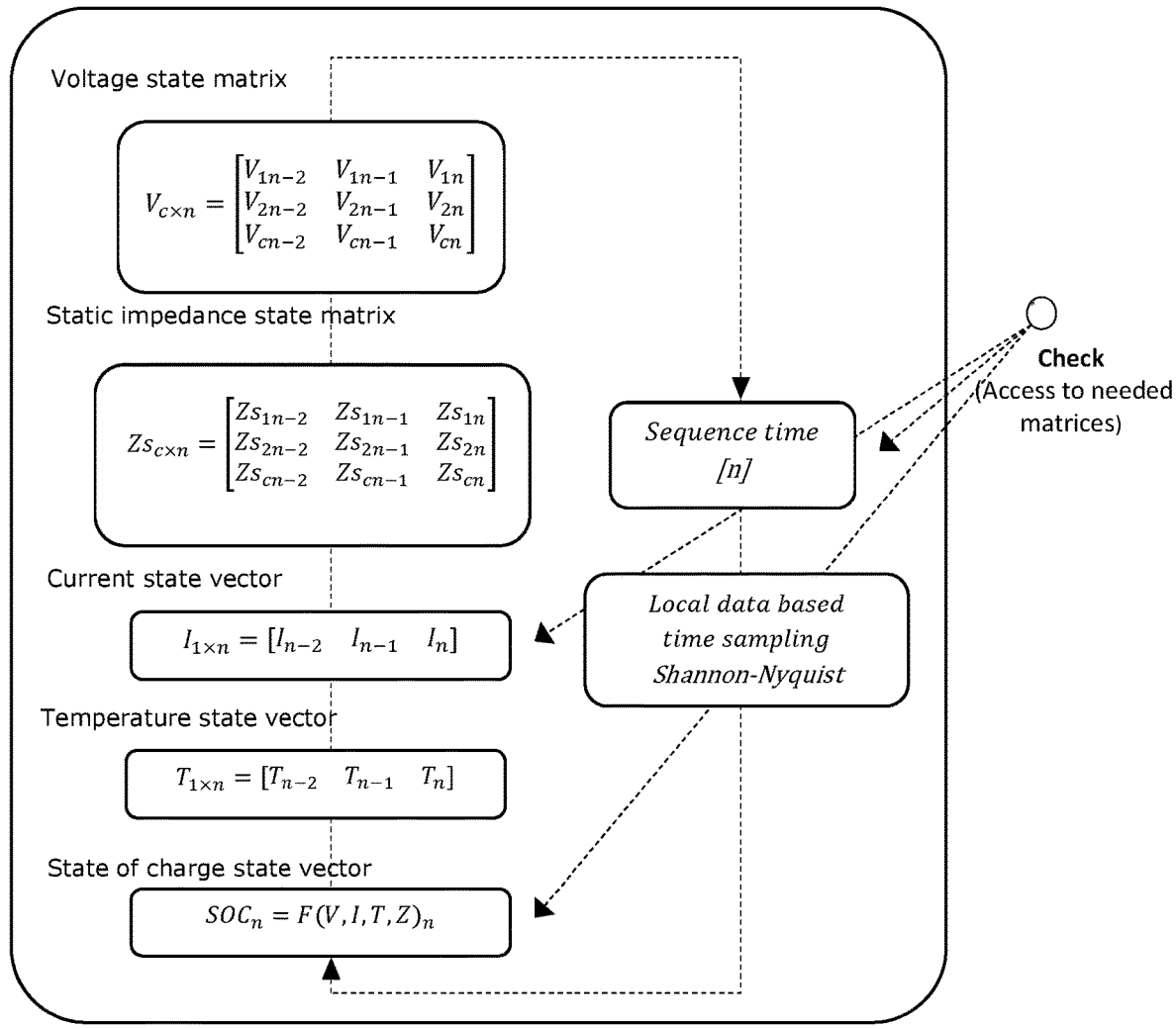
FIG. 13 illustrates a State-Machine-Finite-State-Machine embodiment.
Figure 14:
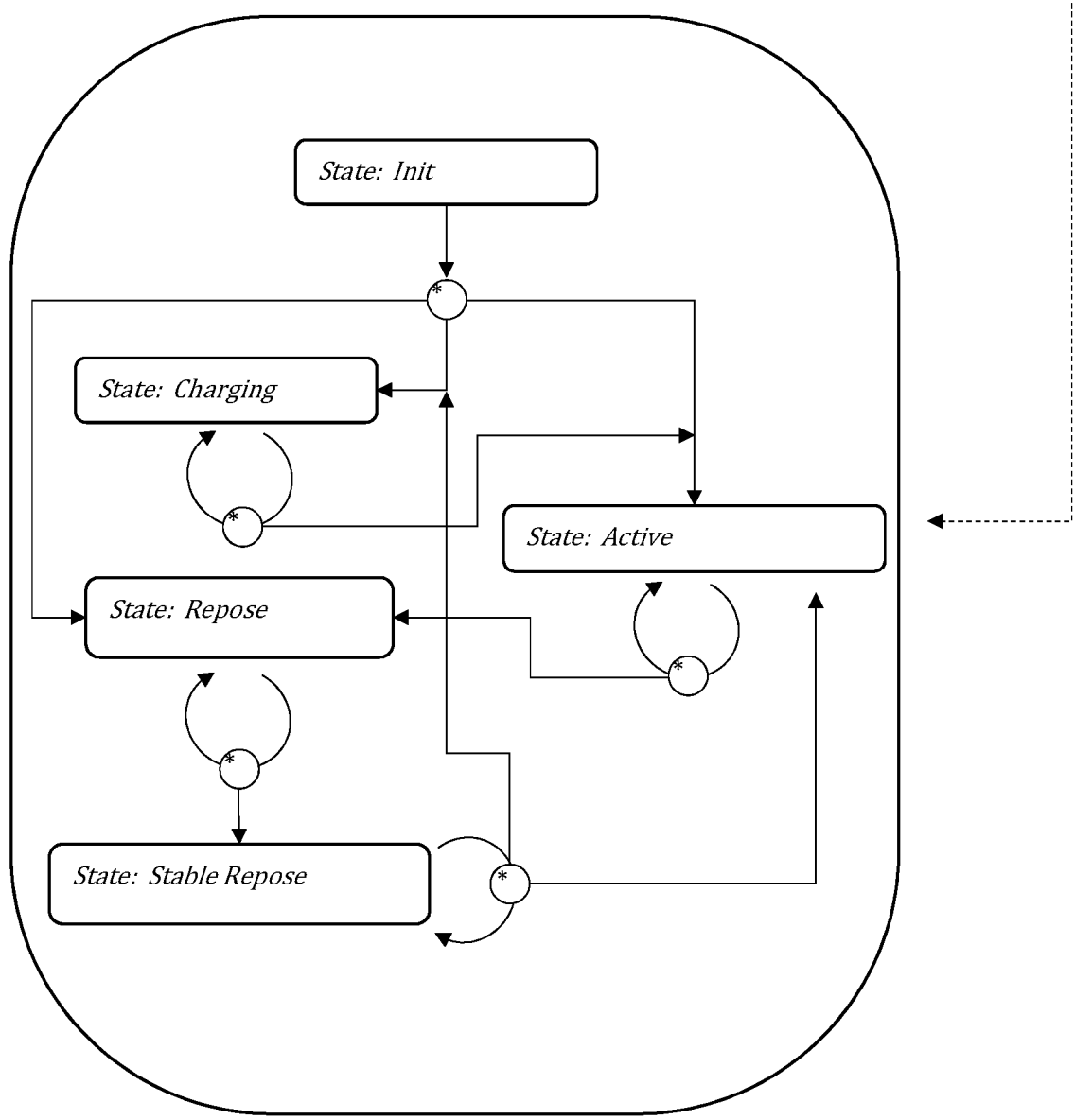
FIG. 14 illustrates a State-Machine-Finite-State-Machine embodiment.

In the diagrams shown in FIG. 13 and FIG. 14, we depict an example of an implementation of the state-space FSM system representation. In the shown algorithm, the battery, charger and/or other elements to control, have and internal model representation based on its state variable matrices (FIG. 13). All these state matrices are updated in real time (for example in the millisecond range) so the microprocessor has an internal model of the 'object' to control as battery, current charger, etc. An independent Finite State Machine (FIG. 14) runs in a separate process. This FSM continuously defines its state regularly accessing (asynchronously) and reading values of the state matrix relevant only for it present state of for a state change.

In this example, the battery management system has a space-state defined by its state variables. In a BMS the main state of a group of Li-ion cells is determined by four state variables: voltage, current (flowing in or out) and their internal impedance (dynamic and static) determined by their Sate of Health. This represents a model at a behavioral level, we could also model the system at an electrochemical level, or at a circuit level (as a combination of capacitors and parallel and series resistance). Each battery pack can have 'c' cells and we will work in a system with, for example, 'n' memories.

The state variables matrix is updated in real time (real time in time scale defined by the sample time associated to the highest relevant frequencies of the system). A related Finite-Sate-Machine (FSM) asynchronously accesses the required state variables of the matrix and decides, based on these matrix variables, the next state of the machine over a predefined map of possible system states. The FSM approach simplifies the debugging process as the systems is always in a known state, allowing an easy tracking and modification of the specific state in case of errors. Also, the FSM approach avoids potential undefined states of long software code, and allows horizontal system descriptions over several platforms, for example, hardware description level languages or microcontroller firmware compilers. The overall behavior of the system, for example, not balancing cells while the battery system is discharging or in 'active' mode, or not turning on the opto-inductions LED to find out if there is a charging base station while a drone is flying, are easily defined and planned using this methodology.

Figure 15:
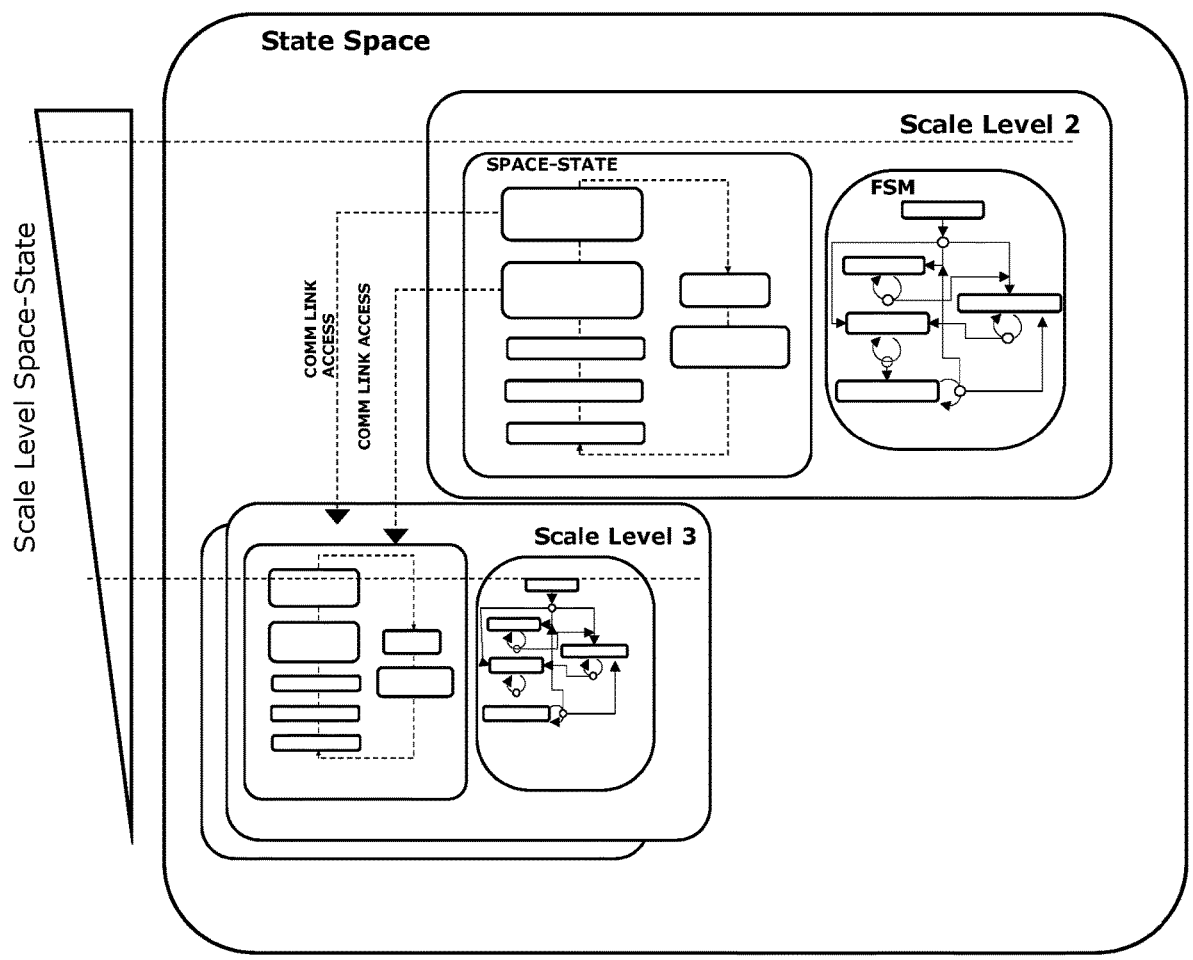
FIG. 15 illustrates a higher level software representation of a Cloud-state Space algorithm.

When a complex system can be divided in a hierarchical level, several of the described state-matrix-FSM representations can interact at a multi-scale level. An example describing a possible embodiment of the invention for such a complex multi-hierarchical level system is described below and is illustrated in FIG. 15.

Electric vehicles with several opto-induction discs may allow a faster recharge using distributed small local battery packs or capacitor banks. These local energy accumulation elements may be composed of lithium ion cells with special chemistries or capacitor banks with high power densities to quickly absorb the energy bursts transferred from the wireless power transmitter. As normally high-power density devices do not have high-energy density and/or capacity, energy must be transferred subsequently to a larger battery pack with lower current rate capacity at lower transfer rates. Each of these distributed high power density accumulation systems can have their local management and balance systems, and the main battery pack can have its own central BMS, which decides the inflow energy transfer rate from each of the said distributed energy accumulators based on several parameters. Each local accumulator BMS can be running the space-state matrix and FSM representation of its own system. But the higher level BMS, located in the larger central accumulator, will need to access each of the local state-matrices and FSM to define the state of the overall system and its own FSM state. When the basic functional block of the software method representation, the State-space-FSM algorithm, is replicated at different scales of behavioral level and time domains, a complete space-state structure solution is defined as shown in FIG. 15. This inter-scale structure can be located at different hardware and software distributed element, and each scale can access its own space-state or lower level space-state matrices through communication links While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

The invention claimed is:
1. A system comprising:
  a stationary unit comprising:
    a power source;
    a plurality of energy transmitting inductive devices coupled to said power source;
    a plurality of receiving optical elements each associated with one or more of said plurality of energy transmitting inductive devices; and
    a first switching circuit coupled to said power source, to said plurality of energy transmitting inductive devices and to said plurality of receiving optical elements, wherein said first switching circuit is operable to transfer energy from said power source to one or more of said energy transmitting inductive devices;
  a mobile unit comprising:
    an energy receiving inductive device operable to receive energy from one or more of said plurality of energy transmitting inductive devices;
    a transmitting optical element operable to communicate with one or more of said plurality of receiving optical elements;
    a second switching circuit coupled to said energy receiving inductive device operable to transfer energy from said energy receiving inductive device;
    a control circuit coupled to said second switching circuit and to said transmitting optical element operable to control the transfer of energy from one or more of said plurality of energy transmitting inductive devices to said energy receiving inductive device;
  wherein said stationary unit detects an alignment of the mobile unit and the stationary unit using said plurality of receiving optical elements and selectively operates one or more of said plurality of energy transmitting inductive devices based on an activation of an associated one or more of said plurality of receiving optical elements.

2. The system of claim 1 wherein said mobile unit further comprises:
  one or more batteries coupled to said energy receiving inductive device; and
  wherein said control circuit comprises a battery management system (BMS) operable to control charging of said one or more batteries.

3. The system of claim 1 wherein said mobile unit further comprises:
  a load device coupled to said energy receiving inductive device without the use of batteries to store charge; and
  wherein said control circuit is operable to transfer energy from one or more of said plurality of energy transmitting inductive devices in accordance with energy requirements of said load device.

4. The system of claim 1 wherein said plurality of energy transmitting inductive devices are arranged in an array and each of said plurality of energy transmitting inductive devices has an associated one of said plurality of receiving optical elements positioned in its approximate center.

5. The system of claim 4 wherein additional ones of said plurality of receiving optical elements are positioned between and associated with adjacent ones of said plurality of energy transmitting inductive devices.

6. The system of claim 1 wherein the control circuit operates the second switching circuit and the transmitting optical element at a cycle time of between 10 microseconds and 100 microseconds.

7. The system of claim 6 wherein the cycle time is approximately 20 microseconds.

8. The system of claim 1 wherein the mobile unit is attached to a moving vehicle and is operable to transfer energy between one or more of said plurality of energy transmitting inductive devices and said energy receiving inductive device while the mobile unit moves at a speed relative to said stationary unit.

9. The system of claim 8 wherein said speed relative to said stationary unit is greater than 10 meters per second.

10. The system of claim 1 wherein:
  said stationary unit comprises a plurality of transmitting optical elements; and
  said mobile unit comprises a receiving optical element;
  wherein said stationary unit and said mobile unit are operable to perform bi-directional data communication.

11. The system of claim 10 wherein said bi-directional data communication comprises a digital transaction between the mobile unit and a host system.

12. The system of claim 2 wherein said battery management system (BMS) employs a Finite State Machine (FSM) to control said second switching circuit and said transmitting optical element.

13. The system of claim 2 further comprising a battery monitoring unit that monitors a state of said one or more batteries including charging and discharging processes.

14. The system of claim 13 wherein said battery management system (BMS) controls the second switching circuit and the transmitting optical element so that said one or more batteries are charged at a rate of approximately 1C or greater.

15. The system of claim 1 wherein said mobile unit comprises:
   a plurality of energy receiving inductive devices operable to receive energy from one or more of said plurality of energy transmitting inductive devices; and
   a plurality of transmitting optical elements each associated with one or more of said plurality of energy receiving inductive devices.

16. A method of wirelessly transferring energy from a stationary unit to a mobile unit comprising the steps of:
   transmitting an optical signal by a transmitting optical element in the mobile unit;
   receiving the optical signal by one or more of a plurality of receiving optical elements in the stationary unit;
   controlling a first switching circuit in the stationary unit, based on the optical signal, to transfer energy between a power source and one or more of a plurality of energy transmitting inductive devices;
   controlling a second switching circuit in the mobile unit to receive energy from said one or more of said plurality of energy transmitting inductive devices by an energy receiving inductive device;
   wherein said stationary unit detects an alignment of the mobile unit and the stationary unit using said plurality of receiving optical elements and selectively operates one or more of said plurality of energy transmitting inductive devices based on an activation of an associated one or more of said plurality of receiving optical elements.

17. The method of claim 16 wherein said step of controlling a second switching circuit utilizes a battery management system (BMS) operable to control charging of one or more batteries coupled to said energy receiving inductive device.

18. The method of claim 16 wherein said step of controlling a second switching circuit comprises the transfer of energy from said one or more of said plurality of energy transmitting inductive devices in accordance with energy requirements of a load device coupled to said energy receiving inductive device without the use of batteries to store charge.

19. The method of claim 16 wherein said plurality of energy transmitting inductive devices are arranged in an array and each of said plurality of energy transmitting inductive devices has an associated one of said plurality of receiving optical elements positioned in its approximate center.

20. The method of claim 19 wherein additional ones of said plurality of receiving optical elements are positioned between and associated with adjacent ones of said plurality of energy transmitting inductive devices.

21. The method of claim 16 wherein said step of controlling a second switching circuit operates at a cycle time of between 10 and 100 microseconds.

22. The method of claim 21 wherein the cycle time is approximately 20 microseconds.

23. The method of claim 16 wherein the mobile unit is attached to a moving vehicle and the mobile unit is operable to transfer energy between one or more of said plurality of energy transmitting inductive devices and said energy receiving inductive device while the mobile unit moves at a speed relative to said stationary unit.

24. The method of claim 23 wherein said speed relative to said stationary unit is greater than 10 meters per second.

25. The method of claim 16 wherein:
   said stationary unit comprises a plurality of transmitting optical elements; and
   said mobile unit comprises a receiving optical element;
   wherein said stationary unit and said mobile unit are operable to perform bi-directional data communication.

26. The method of claim 25 wherein said bi-directional data communication comprises a digital transaction between the mobile unit and a host system.

27. The method of claim 17 wherein said battery management system (BMS) employs a Finite State Machine (FSM) to control said second switching circuit and said transmitting optical element.

28. The method of claim 17 wherein said step of controlling a second switch circuit comprises monitoring a state of said one or more batteries including charging and discharging processes.

29. The method of claim 28 wherein said battery management system (BMS) controls the second switching circuit and the transmitting optical element so that said one or more batteries are charged at a rate of approximately 1C or greater.

30. The method of claim 16 wherein said mobile unit comprises:
   a plurality of energy receiving inductive devices operable to receive energy from one or more of said plurality of energy transmitting inductive devices; and
   a plurality of transmitting optical elements each associated with one or more of said plurality of energy receiving inductive devices.

\* \* \* \* \*